(12) United States Patent
Brown et al.

(10) Patent No.: US 7,890,554 B2
(45) Date of Patent: Feb. 15, 2011

(54) APPARATUS AND METHOD OF EXPORTING FILE SYSTEMS WITHOUT FIRST MOUNTING THE FILE SYSTEMS

(75) Inventors: William B. Brown, Austin, TX (US); Mark Allen Grubbs, Round Rock, TX (US); Gerald Francis McBrearty, Austin, TX (US); Wu Zheng, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2211 days.

(21) Appl. No.: 10/099,777

(22) Filed: Mar. 14, 2002

(65) Prior Publication Data

US 2003/0177107 A1  Sep. 18, 2003

(51) Int. Cl.
*G06F 17/30* (2006.01)
(52) U.S. Cl. .................................. 707/822; 707/828
(58) Field of Classification Search ................. 707/205, 707/802, 812, 821, 822, 825, 828
See application file for complete search history.

(56) References Cited

U.S. PATENT DOCUMENTS

| | | | | |
|---|---|---|---|---|
| 5,497,491 A | * | 3/1996 | Mitchell et al. | 719/315 |
| 5,724,512 A | * | 3/1998 | Winterbottom | 709/226 |
| 6,275,953 B1 | * | 8/2001 | Vahalia et al. | 714/11 |
| 6,449,731 B1 | * | 9/2002 | Frey, Jr. | 714/9 |
| 6,714,953 B2 | * | 3/2004 | Grubbs et al. | 707/205 |

* cited by examiner

*Primary Examiner*—Cam-Linh Nguyen
(74) *Attorney, Agent, or Firm*—VanLeeuwen & VanLeeuwen; Diana R. Gerhardt

(57) ABSTRACT

A method, system and apparatus for exporting file systems without having to mount them first are provided. Most Unix-based servers usually mount some system operation critical files at startup. Thus, directories have to be mounted. One or more of these directories are usually used as mount points for mounting other file systems when needed. An extended attribute file is used to provide all information needed to export a file system. Thus, a server need not mount a file system to obtain this information. That is on startup, a server needs only refer to these extended attribute files to obtain the information needed to export the file systems.

12 Claims, 7 Drawing Sheets

| FILE SYSTEMS | DEVICES |
|---|---|
| FILE SYSTEM$_1$ | DEVICE NAME$_1$ |
| FILE SYSTEM$_2$ | DEVICE NAME$_2$ |
| ○ | ○ |
| ○ | ○ |
| ○ | ○ |

| FILE SYSTEMS | DEVICES |
|---|---|
| FILE SYSTEM$_1$ | DEVICE NAME$_1$ |
| FILE SYSTEM$_2$ | DEVICE NAME$_2$ |
| ○<br>○<br>○ | ○<br>○<br>○ |

FIG. 8

APPARATUS AND METHOD OF EXPORTING FILE SYSTEMS WITHOUT FIRST MOUNTING THE FILE SYSTEMS

BACKGROUND OF THE INVENTION

1. Technical Field

The present invention is directed to a method and apparatus for managing data storage systems. More specifically, the present invention is directed to a method and apparatus for exporting file systems without first mounting them.

2. Description of Related Art

Network file system (NFS) is a client-server application that allows network users to access shared files stored on computer systems of different types. Users can manipulate shared files as if they were stored locally (i.e., on the users' own hard disk). With NFS, computer systems connected to a network operate as clients when accessing remote files and as servers when providing remote users access to local shared files. The NFS standards are publicly available and widely used.

NFS uses a hierarchical file system, with directories as all but the bottom level of files. Each entry in a directory (file, directory, device, etc.) has a string name. Different operating systems (OSs) may have restrictions on the depth of the names used, as well as using different syntax to represent a pathname. A pathname is a concatenation of all the components (directory and file names) in the name. A file system is a tree on a single server (usually a single disk or physical partition) with a specified root directory.

Some OSs provide a "mount" operation that makes all file systems appear as a single tree, while others maintain a multiplicity of file systems. To mount a file system is to make the file system available for use at a specified location, the mount point. To use an analogy, suppose there is a tree that contains a plurality of branches, as most trees do, but the branches are not attached to the tree. Upon startup, some OSs attach each branch of the tree at its proper location (the mount point) on the tree. Other OSs, however, do not attach the branches to the tree on startup but instead leave them in their storage place. Each branch, in this case, is referred to as a file system.

Most computer systems, especially those running Microsoft OSs, generally attach all the branches to the tree on startup. However, Unix-based computer systems typically do not do so. They only attach certain branches to the tree on startup. These attached branches (or file systems or directories) are the ones that contain files that are critical for the OS to function properly. The other file systems (branches) are mounted (attached to the tree) only when needed.

One particular time a file system is mounted is just before the file system is exported. To export a file system is to make the file system available for NFS clients to mount (i.e., to attach the branch to their own tree). When exporting a file system, the mount point as well as the name of the storage device containing the file system must be provided (i.e., the location on the tree where the branch is to be attached as well as the location where the branch is stored must be provided). If the file system is mounted, all the needed information is known; hence, the reason why file systems are mounted before they are exported.

As mentioned before, most Unix-based servers mount some file systems only when they are needed. But, if a mounted non-critical OS file system has not been used within a pre-defined amount of time, it will be unmounted. This allows for other file systems to be mounted if needed. As will be explained later, mounting file systems can be a relatively time-consuming and CPU-intensive endeavor. Thus, mounting file systems only for export purposes may be a great waste of time and energy, especially if the file systems are subsequently dismounted without ever having been used.

Thus, what is needed is an apparatus and method of mounting file systems when they are to be used rather than when they are to be exported.

SUMMARY OF THE INVENTION

The present invention provides a method, system and apparatus for exporting file systems without having to mount them first. Most Unix-based servers usually mount some system operation critical files on startup. Thus, some directories are mounted. One or more of these directories are usually used as mount points for mounting other file systems when needed. According to the invention, an extended attribute file is used to provide all information needed to export a file system. Each mount point has an associated extended attribute file. Thus on startup, a server needs only refer to these extended attribute files to obtain the information needed to export the file systems.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 illustrates information contained in an extended attribute file.

DETAILED DESCRIPTION OF THE PREFERRED EMBODIMENT

Figure 1:
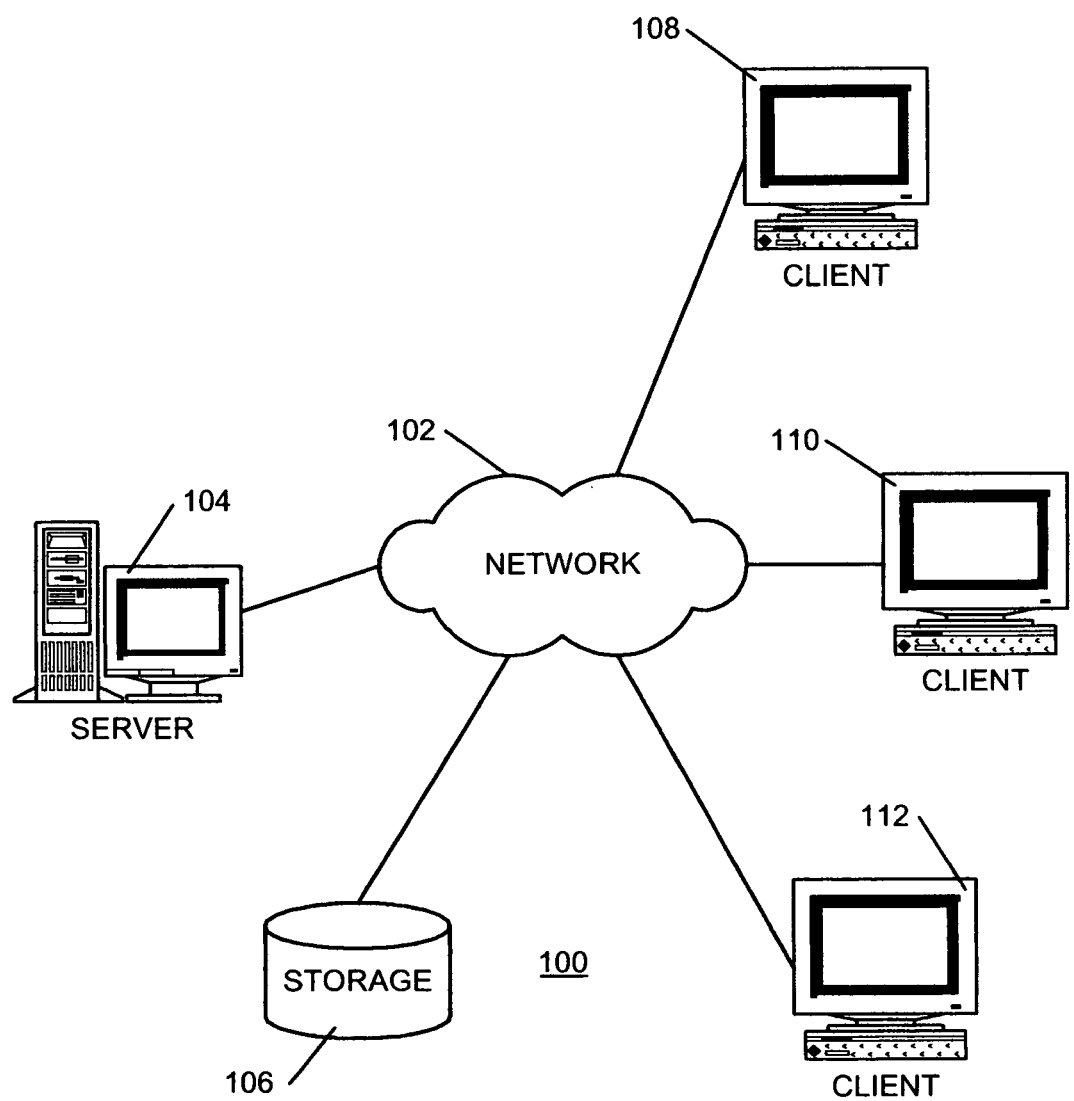
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
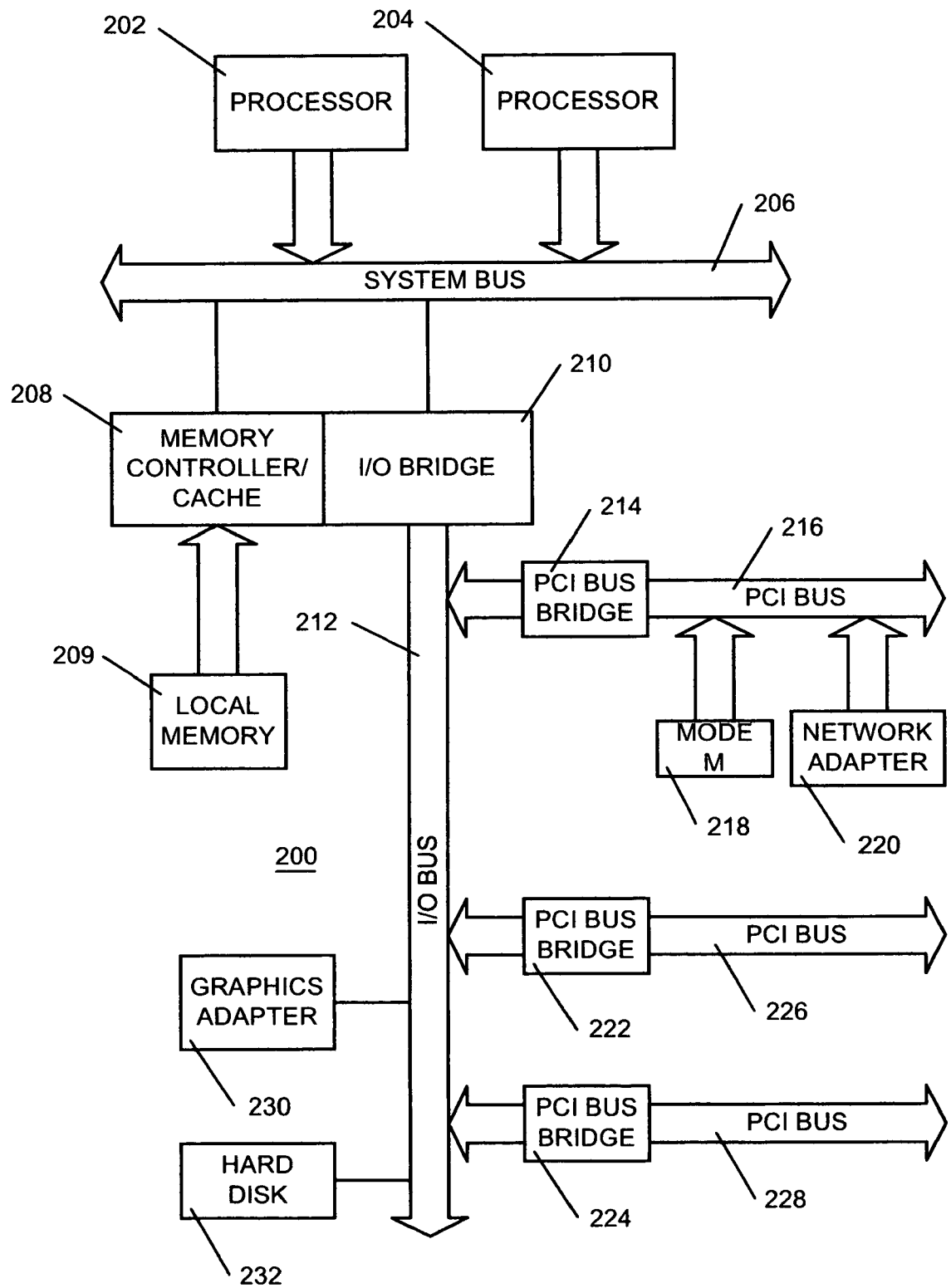
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, New York, running the Advanced Interactive Executive (AIX) operating system or LINUX operating system.

Figure 3:
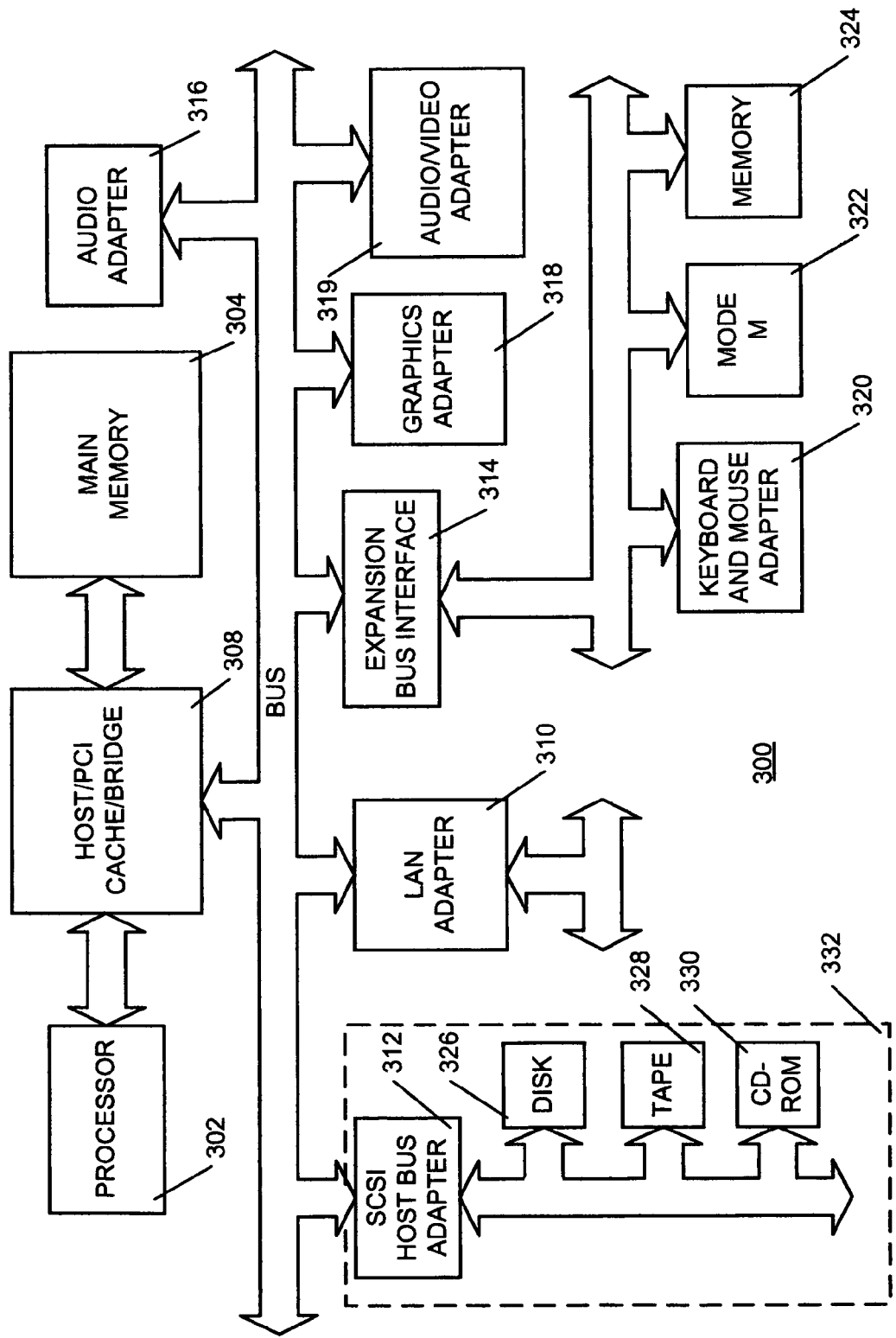
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method of mounting file systems when needed rather than when they are being exported. Although the invention may preferably be local to server 104, it may nonetheless, be local to client systems 108, 110 and 112 of FIG. 1 or to both the server 104 and clients 108, 110 and 112. Consequently, the present invention may reside on any data storage medium (i.e., floppy disk, compact disk, hard disk, ROM, RAM, etc.) used by a computer system.

Modern Unix-based computer systems use an interface known as the virtual file system (VFS) that runs on top of TCP/IP (Transport Control protocol/Internet Protocol) to provide access to shared files to users on a network. VFS identifies files via virtual i-nodes (usually known as v-nodes). An i-node is a data structure that contains information such as user and group ownerships, access mode (i.e., read, write, execute permissions) and type about files in Unix file systems. I-nodes are created when a file system is created. There is a set number of i-nodes in each file system. This number indicates the maximum number of files the system can hold. Thus, each file has an i-node and is identified by an i-node number (i.e., an i-number).

Clients access files on a server by first having the server mount exported directories within which the files are contained. To do so, the clients have to use a series of remote procedure calls (RPC). There are three types of NFS mounts: predefined, explicit, and automatic.

Predefined mounts are specified in a /etc/filesystems file. Each stanza (or entry) in this file defines the characteristics of a mount. Data such as host name, remote path, local path, and any mount options are listed in this stanza. Predefined mounts are used when certain mounts are always required for proper operation of a client.

Explicit mounts are generally for root users. Explicit mounts are usually done for short periods of time when there is a requirement for occasional unplanned mounts. Explicit mounts can also be used if a mount is required for special tasks and that mount should not be generally available on the NFS client. These mounts are usually fully qualified on the command line by using the mount command with all needed information. File systems mounted explicitly remain mounted unless explicitly unmounted with the umount command or until the system is restarted.

Automatic mounts are controlled by an automount command. The automount command causes an AutoFS kernel extension to monitor specified directories for activity. If a program or user attempts to access a directory that is not currently mounted, the AutoFS intercepts the request, arranges for the mount of the file system, then services the request.

The following describes the mounting process. When a server is turned on or is refreshed, a /etc/rc.nfs script runs an exportfs command. The exportfs command reads the /etc/exports file of the server to determine which directories are to be exported. Once done, the kernel is notified of the directories that are to be exported as well as which access restrictions they require. Then, an rpc.mountd daemon and several nfsd daemons (8, by default) are started by the /etc/rc.nfs script.

When a client is turned on or is refreshed, it runs a /etc/rc.nfs script which starts several biod (block I/O daemon) daemons (8, by default), which forward client mount requests to the appropriate server. Then the /etc/rc.nfs script executes the mount command, which reads the file systems listed in the /etc/filesystems file. The mount command locates one or more servers that exported the information the client wants and sets up communication between itself and that server. This process is called binding. The mount command then requests that one or more servers allow the client to access the directories in the client /etc/filesystems file.

When the server rpc.mountd daemon receives the client mount requests, it either grants them or denies them. If the requested directory is available to that client, the rpc.mountd daemon sends the client's kernel an identifier called a file handle. The client kernel then ties the file handle to a mount point (a directory) by recording certain information in a mount record. Once the file system is mounted, the client can perform file operations. When the client does a file operation, a biod daemon sends the file handle to the server, where the file is read by one of the nfsd daemons to process the file request. Assuming the client has access to perform the requested file operation, the nfsd daemon returns the necessary information to the client's biod daemon.

Figure 4:
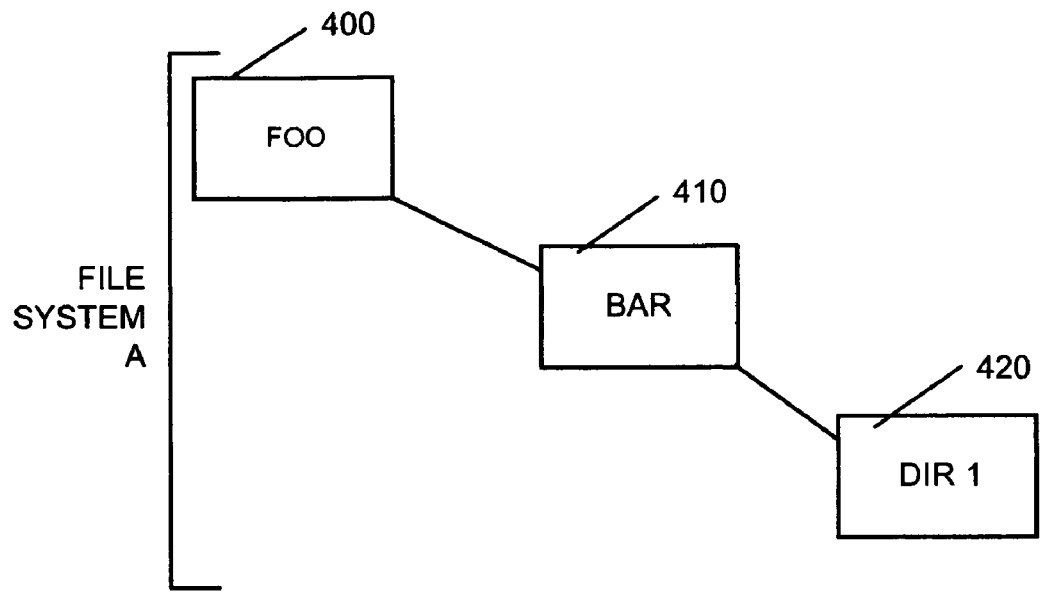
FIG. 4 illustrates a file system having a mount point that may be mounted at startup.
Figure 5:
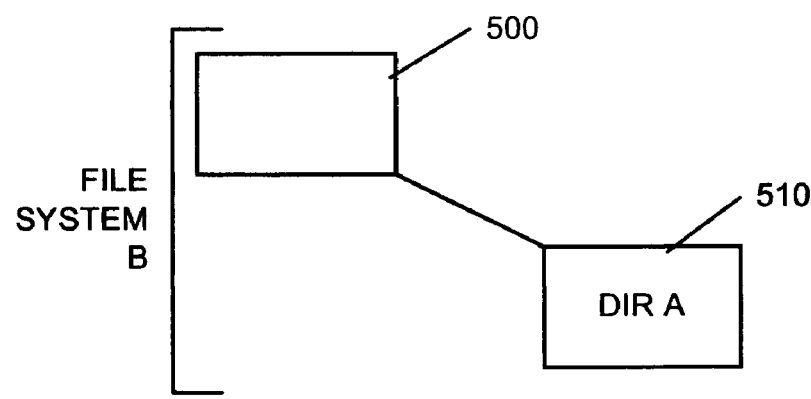
FIG. 5 illustrates a file system that may be mounted at the mount point of the file system in FIG. 4.

The problem is that currently when a server wants to export a file system, it must mount the file system at a mount point to determine the name of the device within which the file system is located. To illustrate this point, consider file system A shown in FIG. 4 and file system B depicted in FIG. 5. File system A is a file system that is usually mounted on startup. File system A contains directories foo 400, which is a root directory, bar 410 and dir1 420. Root directory foo 400 and directory bar 410 may contain files and other directories. However, directory dir1 420 is an empty directory. To access dir1, a user must type in "/foo/bar/dir1" as a pathname.

Most Unix-based computer systems often use empty directories as a mount point. For example, a well-known Unix-based system mount point is "/usr" directory. Just as the directory "/foo/bar/dir1" directory, the "/usr" directory is an empty directory. Thus, Unix-based computer systems may use many more mount points than the one illustrated. Returning to FIG. 4, if the computer system on which the dir1 directory is mounted exports /foo/bar/dir1", it will be useless to the clients as it is empty.

Figure 6:
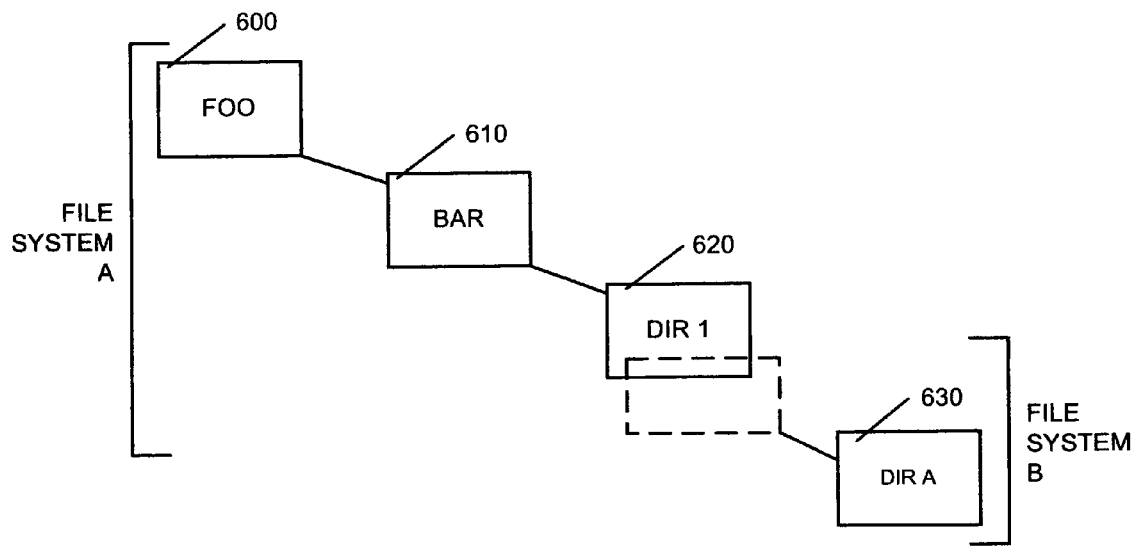
FIG. 6 illustrates the file system in FIG. 5 mounted at the mount point of the file system in FIG. 4.

File system B (shown in FIG. 5), on the other hand, is not usually mounted on startup. File system B contains root directory 500 and dirA 510. Root directory 500 does not have a name. Consequently, dirA cannot be accessed. However, if file system B is mounted at a mount point, dirA will become accessible. FIG. 6 depicts file system B mounted at a mount point. In FIG. 6, the root directory of file system B overlays the mount point of file system A and takes on the name of the mount point. Thus, when file system B is mounted at the mount point of file system A, the directory dirA may be accessed by typing in the pathname "/foo/bar/dir1/dirA". Thus, in order to export dirA, file system B must be mounted on the server. Once mounted, file system B may be exported. To export the mounted file system, the following command may be used: exportfs /foo/bar/dir1. Since the file system is already mounted at the mount point, then all the needed information is obtained from the file system itself.

As mentioned before, mounting a file system for export may not be time efficient as the file system may be unmounted shortly thereafter if not used within a pre-determined time. The present invention provides an apparatus and method of exporting file systems without first mounting the file systems. To do so, the present invention makes use of extended attributes that may be associated with each directory and file in a file system.

An extended attribute is additional non-user data that is associated with a file system object. An extended attribute is different from traditional Unix object attributes such as ownerships, access permission etc. In most Unix-based systems, very little restrictions are placed on contents of extended attributes. Hence, any application program may attach an extended attribute to any object. The attached extended attribute may or may not have meaning outside of that application.

Figure 7:
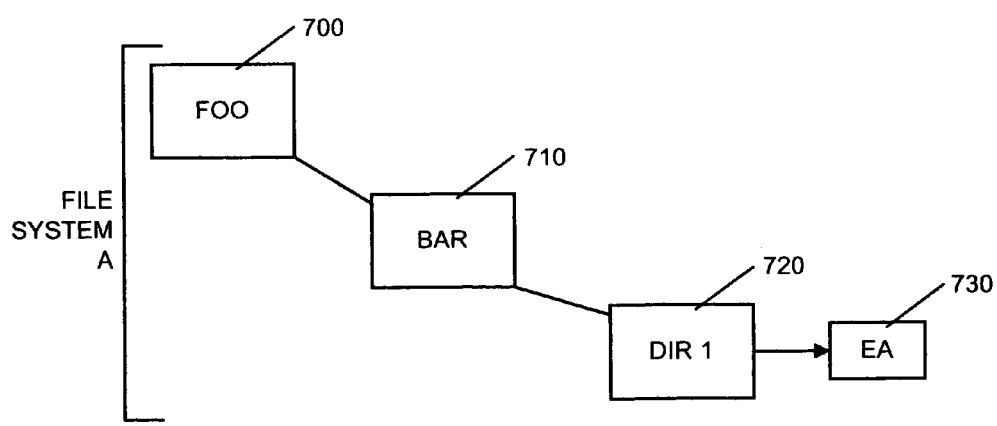
FIG. 7 illustrates a file system with a mount point to which is associated an extended attribute file.

FIG. 7 illustrates a conceptual view of an extended attribute attached to an object. In FIG. 7, the extended attribute is shown to be associated with directory dir1, the mounting point of file system A. The extended attribute is nothing but a file that is linked to directory dir1. The extended attribute file contains all the information needed to export the pathname of file system B to clients. Particularly, the extended attribute file may contain the device names within which the file systems that are to be mounted at that mount point are contained.

FIG. 8 illustrates information contained in an extended attribute file. Again, device name$_1$, device name$_2$ etc. are the device names within which the files systems to be mounted at that mount point is contained. A system administrator who is creating an extended attribute file may find the device names in a "/dev" directory. Note that according to the invention, each mount point has an associated extended attribute file.

Thus, upon startup and after file system A (see FIG. 4) is mounted, the extended attribute associated with mount point dir1 is checked to determine the names of the devices which contain the file systems to be mounted at that mount point. Once this is determined, the file systems may be exported.

Alternatively and in addition to the above-described implementation, a system administrator may provide the needed information to export a file system on the command line at export time. Once provided, the information may be stored in a buffer on the server for future use if necessary.

Figure 9:
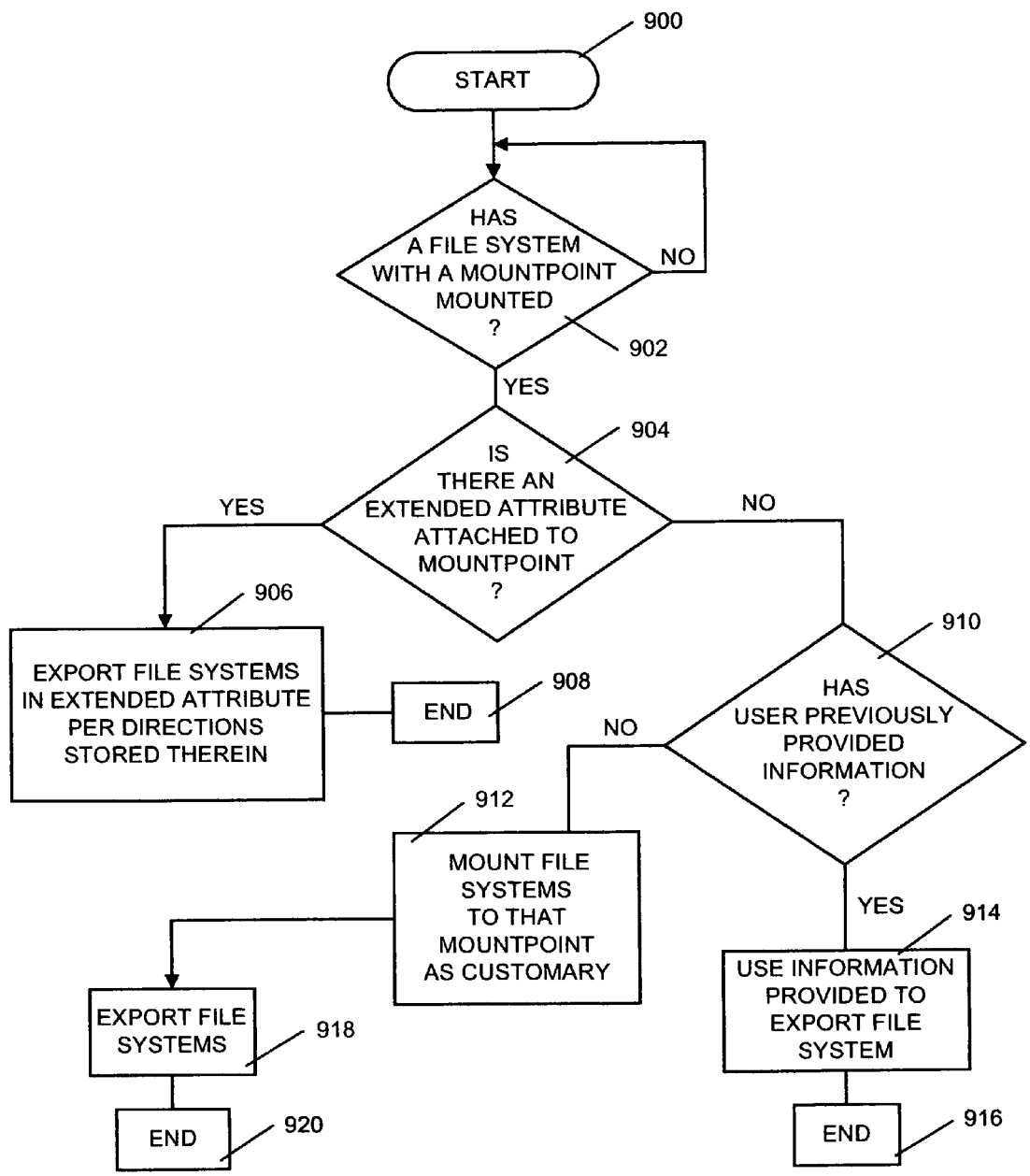
FIG. 9 illustrates a flow diagram of a process that may be used by the present invention.

FIG. 9 depicts a flow chart of a process that may be used by the invention. The process may repeat as many times as there are file systems to be mounted at a mount point. In any event, the process starts when file systems are to be exported (step 900). This usually happens just after startup. A check is made to determine whether a file system with a mount point is mounted. If so, another check is made to ensure that the mount point has an attached extended attribute. If so, then the extended attribute is consulted to retrieve the names of the devices within which the file systems are located and the process for that mount point ends (steps 902, 904, 906 and 908).

If there is not an extended attribute file attached to the mount point, another check is made to determine whether there is user-supplied information regarding the device name containing file systems that are to be mounted at that mount point. If so, the information is used to export those user-supplied file systems and the process ends for that mount point (steps 904, 910, 914 and 916).

If there is not an extended attribute attached to the mount point and there is not user-supplied information regarding the file systems that mount at that mount point, the file systems that should be mounted at the mount point are mounted as customary. Then, the file systems are exported and the process ends for that mount point (steps 910, 912, 918 and 920).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of exporting file systems, comprising:
   consulting a file associated with a mount point of a mounted file system to retrieve needed information to export the file systems, the mount point being the point at which the file systems are mounted on a computer system, wherein the needed information is names of devices within which the file systems are located; and
   exporting the file systems, wherein the file systems are exported without first being mounted.

2. The method of claim 1 wherein the file is an extended attribute file.

3. The method of claim 2 wherein each mount point has an extended attribute file.

4. A computer program product on a computer readable medium for exporting file systems comprising:
   code means for consulting a file associated with a mount point of a mounted file system to retrieve needed information to export the file systems, the mount point being the point at which the file systems are mounted on a computer system, wherein the needed information is names of devices within which the file systems are located; and
   code means for exporting the file systems, wherein the file systems are exported without first being mounted.

5. The computer program product of claim 4 wherein the file is an extended attribute file.

6. The computer program product of claim 5 wherein each mount point has an extended attribute file.

7. An apparatus for exporting file systems comprising:
   means for consulting a file associated with a mount point of a mounted file system to retrieve needed information to export the file systems, the mount point being the point at which the file systems are mounted on a computer system, wherein the needed information is names of devices within which the file systems are located; and
   means for exporting the file systems, wherein the file systems are exported without first being mounted.

8. The apparatus of claim 7 wherein the file is an extended attribute file.

9. The apparatus of claim 8 wherein each mount point has an extended attribute file.

10. A computer system for exporting file systems comprising:
    at least one storage device for storing code data; and
    at least one processor for processing the code data to consult a file associated with a mount point of a mounted file system to retrieve needed information to export the file systems, the mount point being the point at which the file systems are mounted on the computer system, wherein the needed information is names of devices within which the file systems are located, and to export the file systems, wherein the file systems are exported without first being mounted.

11. The computer system of claim 10 wherein the file is an extended attribute file.

12. The computer system of claim 11 wherein each mount point has an extended attribute file.

* * * * *